US011567986B1

(12) United States Patent
Underwood et al.

(10) Patent No.: US 11,567,986 B1
(45) Date of Patent: Jan. 31, 2023

(54) MULTI-LEVEL NAVIGATION FOR MEDIA CONTENT

(71) Applicant: Meta Platforms, Inc., Menlo Park, CA (US)

(72) Inventors: Patrick Joseph Roark Underwood, San Francisco, CA (US); Geoff David Joseph Teehan, Palo Alto, CA (US); George Lewis Kedenburg, III, San Francisco, CA (US); Jason Holland, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/358,380

(22) Filed: Mar. 19, 2019

(51) Int. Cl.
  *G06F 16/44* (2019.01)
  *G06F 16/45* (2019.01)
  *G06F 3/04817* (2022.01)
  *G06F 16/435* (2019.01)

(52) U.S. Cl.
  CPC ........ *G06F 16/444* (2019.01); *G06F 3/04817* (2013.01); *G06F 16/435* (2019.01); *G06F 16/45* (2019.01)

(58) Field of Classification Search
  CPC ........... G06F 16/40–489; G06F 16/444; G06F 3/048; G06F 16/435–437; G06F 16/45; G06F 3/04817; G06F 3/0488; G06F 3/0485–04855; G06Q 50/01
  See application file for complete search history.

(56) References Cited

U.S. PATENT DOCUMENTS

| 8,645,463 | B2 | 2/2014 | Knight et al. |
| 10,009,308 | B2 | 6/2018 | Brunn et al. |
| 10,168,822 | B2 * | 1/2019 | Takahashi ............. G06F 3/0482 |
| 10,868,788 | B1 | 12/2020 | Underwood et al. |
| 2009/0148124 | A1 | 6/2009 | Athsani et al. |

(Continued)

OTHER PUBLICATIONS

Holland, Jason, "Systems and Methods for Digital Content Navigation Based on Directional Input", U.S. Appl. No. 17/008,089, filed Aug. 31, 2020, 59 pages.

(Continued)

*Primary Examiner* — Liang Y Li
(74) *Attorney, Agent, or Firm* — Greenberg Traurig, LLP

(57) ABSTRACT

The disclosed computer-implemented method may include (1) providing a plurality of media content groups, where each media content group includes a plurality of media content items, (2) providing a plurality of group indicators, where each group indicator corresponds with one of the media content groups, (3) providing a first navigational path linking the group indicators sequentially, (4) providing, for each media content group, a second navigational path linking the media content items of the corresponding media content group sequentially, (5) providing, for each media content group, a group entry point linking to one of the media content items of the corresponding media content group, and (6) presenting a graphical user interface that facilitates access to the media content items, and to the group indicators, using the first navigational path, the second navigational paths, and the group entry points. Various other methods, systems, and computer-readable media are also disclosed.

19 Claims, 12 Drawing Sheets

User Interface Map
100

(56) References Cited

U.S. PATENT DOCUMENTS

| | | | |
|---|---|---|---|
| 2009/0150775 A1* | 6/2009 | Miyazaki | G06F 3/03547 345/173 |
| 2009/0177754 A1 | 7/2009 | Brezina et al. | |
| 2009/0216859 A1 | 8/2009 | Dolling | |
| 2010/0211872 A1* | 8/2010 | Rolston | G06F 9/451 715/702 |
| 2011/0010182 A1 | 1/2011 | Turski et al. | |
| 2011/0271328 A1 | 11/2011 | Sutton-Shearer | |
| 2011/0283304 A1 | 11/2011 | Roberts et al. | |
| 2011/0289067 A1 | 11/2011 | Jordan et al. | |
| 2012/0005224 A1 | 1/2012 | Ahrens et al. | |
| 2012/0089950 A1* | 4/2012 | Tseng | G06F 3/0484 715/854 |
| 2012/0110052 A1 | 5/2012 | Smarr et al. | |
| 2012/0110621 A1 | 5/2012 | Gossweiler, III | |
| 2012/0151322 A1 | 6/2012 | Lindsay et al. | |
| 2012/0151337 A1* | 6/2012 | Pallakoff | G06F 16/444 715/273 |
| 2012/0210386 A1 | 8/2012 | Kim et al. | |
| 2013/0073976 A1* | 3/2013 | McDonald | G06F 16/447 715/739 |
| 2013/0106903 A1* | 5/2013 | Nagata | G06F 3/04883 345/619 |
| 2014/0032672 A1 | 1/2014 | Yoshikawa et al. | |
| 2014/0047074 A1 | 2/2014 | Chung et al. | |
| 2014/0049692 A1 | 2/2014 | Sirpal et al. | |
| 2014/0189010 A1 | 7/2014 | Brown et al. | |
| 2014/0244659 A1 | 8/2014 | Liu et al. | |
| 2014/0317116 A1 | 10/2014 | Shah et al. | |
| 2014/0317201 A1 | 10/2014 | McNeil et al. | |
| 2014/0317660 A1 | 10/2014 | Cheung et al. | |
| 2014/0359789 A1 | 12/2014 | Pitt | |
| 2015/0022558 A1* | 1/2015 | Li | G06F 1/1694 345/650 |
| 2016/0057154 A1* | 2/2016 | Ferguson | H04L 63/104 715/741 |
| 2016/0171453 A1 | 6/2016 | Zorfas | |
| 2016/0197993 A1 | 7/2016 | Perkowski et al. | |
| 2016/0330258 A1 | 11/2016 | Sandhu | |
| 2016/0337291 A1 | 11/2016 | Park et al. | |
| 2016/0373455 A1 | 12/2016 | Shokhrin et al. | |
| 2016/0380952 A1 | 12/2016 | Vora et al. | |
| 2017/0164063 A1 | 6/2017 | Lewis et al. | |
| 2017/0195736 A1 | 7/2017 | Chai et al. | |
| 2017/0270535 A1 | 9/2017 | McKee et al. | |
| 2017/0295249 A1 | 10/2017 | Vickrey et al. | |
| 2017/0315677 A1 | 11/2017 | Rice et al. | |
| 2017/0359290 A1 | 12/2017 | Hsu et al. | |
| 2018/0067641 A1* | 3/2018 | Lerner | G10L 19/00 |
| 2018/0113579 A1* | 4/2018 | Johnston | H04N 21/42224 |
| 2018/0174106 A1 | 6/2018 | Kenthapadi et al. | |
| 2018/0218160 A1 | 8/2018 | Wetherall et al. | |
| 2018/0309806 A1 | 10/2018 | Huynh et al. | |
| 2018/0349502 A1 | 12/2018 | Maycock | |
| 2019/0095067 A1 | 3/2019 | Huang et al. | |
| 2020/0159394 A1* | 5/2020 | Chassen | G06F 3/04845 |
| 2020/0267435 A1 | 8/2020 | Gordon et al. | |
| 2021/0029131 A1 | 1/2021 | Mertens et al. | |

OTHER PUBLICATIONS

Holland, Jason, "Systems And Methods For Prioritizing Digital User Content Within A Graphical User Interface", U.S. Appl. No. 17/008,083, filed Aug. 31, 2020, 56 pages.
Preinterview First Office Action received for U.S. Appl. No. 16/358,962 dated Aug. 20, 2020, 14 pages.
Preinterview First Office Action received for U.S. Appl. No. 16/358,025 dated Apr. 30, 2020, 55 pages.
First Action Interview received for U.S. Appl. No. 16/358,025 dated Jul. 17, 2020, 55 pages.
Final Office Action received for U.S. Appl. No. 16/358,025 dated Sep. 2, 2020, 77 pages.
Non-Final Office Action received for U.S. Appl. No. 16/358,032 dated Apr. 3, 2020, 40 pages.
Final Office Action received for U.S. Appl. No. 16/358,032 dated Aug. 25, 2020, 45 pages.
Preinterview First Office Action received for U.S. Appl. No. 16/361,631 dated Oct. 2, 2020, 28 pages.
Preinterview First Office Action received for U.S. Appl. No. 16/358,969 dated Apr. 2, 2020, 18 pages.
Final Office Action received for U.S. Appl. No. 16/358,969 dated Jun. 15, 2020, 18 pages.
Notice of Allowance received for U.S. Appl. No. 16/358,969 dated Aug. 25, 2020, 15 pages.
Underwood, Patrick Joseph Roark, "Systems And Methods For Generating Digital Channel Content", U.S. Appl. No. 17/084,690, filed Oct. 30, 2020, 40 pages.
Underwood et al., "Snap Scroll", U.S. Appl. No. 29/684,315, filed Mar. 20, 2019, 16 pages.
Underwood et al., "Fanning Interface", U.S. Appl. No. 29/684,316, filed Mar. 20, 2019, 13 pages.
Underwood et al., "Display Device with Graphical User Interface", U.S. Appl. No. 29/685,031, filed Mar. 26, 2019, 12 pages.
Underwood et al., "Display Device with Graphical User Interface", U.S. Appl. No. 29/685,030, filed Mar. 26, 2019, 12 pages.
Underwood et al., "Display Device with Graphical User Interface", U.S. Appl. No. 29/685,029, filed Mar. 26, 2019, 14 pages.
Underwood et al., "Bottom-Focused Channel Overview", U.S. Appl. No. 29/684,604, filed Mar. 22, 2019, 15 pages.
Underwood et al., "Bottom-Focused Channel", U.S. Appl. No. 29/684,606, filed Mar. 22, 2019, 13 pages.
Underwood et al., "Display Screen with Graphical User Interface", U.S. Appl. No. 29/685,028, filed Mar. 26, 2019, 14 pages.
Underwood et al., "Vertical To Horizontal Interface Flow", U.S. Appl. No. 29/684,609, filed Mar. 22, 2019, 13 pages.
Underwood et al., "Limited Screen to Full Screen Interface Flow", U.S. Appl. No. 29/684,610, filed Mar. 22, 2019, 14 pages.
Holland, Jason, "Display Screen with a Graphical User Interface", U.S. Appl. No. 29/748,663, filed Aug. 31, 2020, 13 pages.
Holland, Jason, "Display Screen with a Graphical User Interface", U.S. Appl. No. 29/748,664, filed Aug. 31, 2020, 12 pages.
Holland, Jason, "Display Screen with a Graphical User Interface", U.S. Appl. No. 29/748,668, filed Aug. 31, 2020, 12 pages.
Holland, Jason, "Display Screen with a Graphical User Interface", U.S. Appl. No. 29/748,669, filed Aug. 31, 2020, 12 pages.
Holland, Jason, "Display Screen with a Graphical User Interface", U.S. Appl. No. 29/748,670, filed Aug. 31, 2020, 12 pages.
Non-Final Office Action received for U.S. Appl. No. 16/358,025 dated Mar. 1, 2021, 75 pages.
Non-Final Office Action received for U.S. Appl. No. 16/358,032 dated Feb. 3, 2021, 57 pages.

* cited by examiner

MULTI-LEVEL NAVIGATION FOR MEDIA CONTENT

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
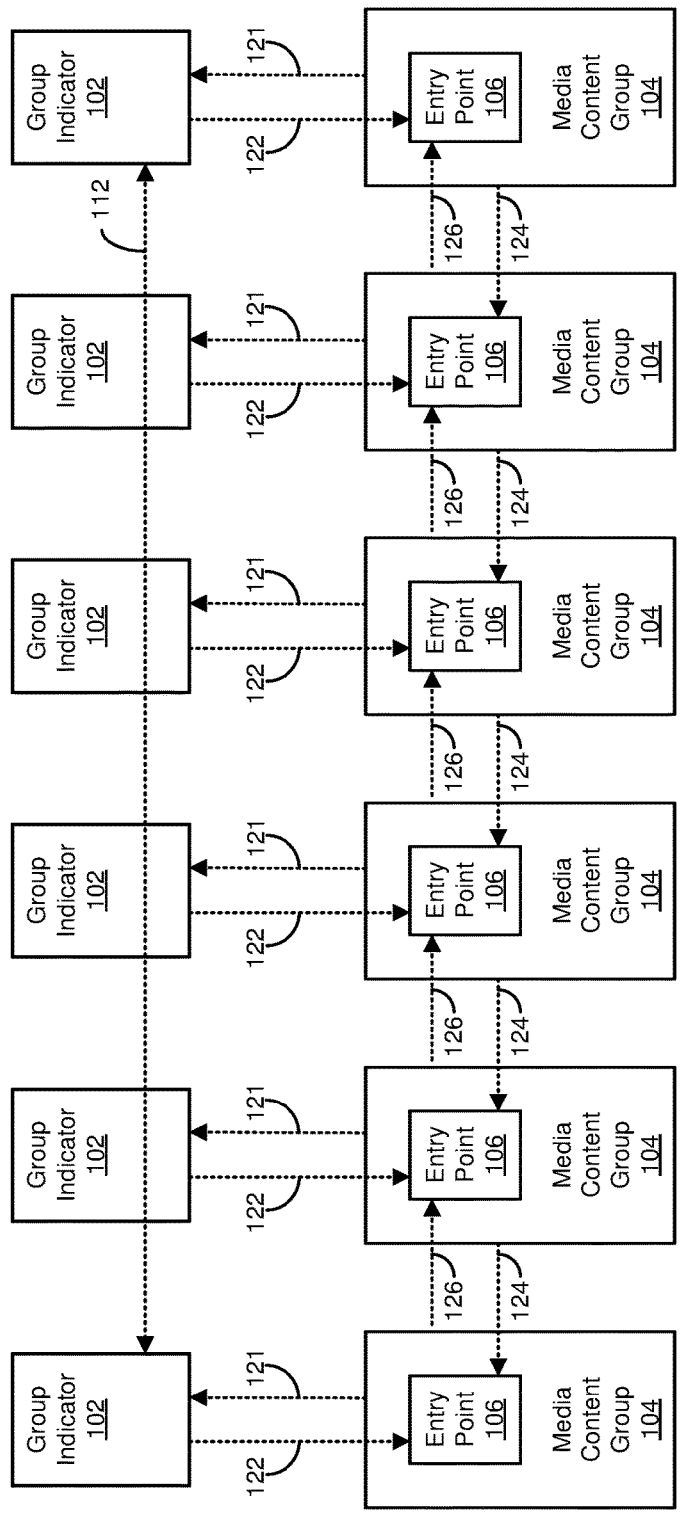
FIG. 1 is a diagram of an exemplary user interface map illustrating multi-level navigation among groups of media content items and corresponding group indicators.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing systems in which multiple media content items, such as images, audio segments, video clips, textual items, and the like may be available for presentation to a user, such items may be organized according to one or more characteristics. For example, photographic images may be organized into groups based on the date the image was captured, the person who captured the image, and so on. For example, the images may be presented in groups of "thumbnail" images (e.g., relatively low-resolution versions of the original images). To select a particular image, the user may select one of the thumbnail images, which then may result in the original image being presented to the user.

In other situations, the items may be accessed by way of a user interface according to hierarchical groups. For example, the user may access a group of pictures taken on a particular day by way of a single graphical icon indicating that day. In response to a user activating that icon, the images for that particular day may then be shown (e.g., one at a time) to the user, or thumbnails of the images may be presented, by which the user may select a particular image to view the original (e.g., higher-definition) version of the image. Conventionally, the user may then proceed to images of other days by returning to a higher level of the group (e.g., the graphical icon) to navigate to images taken on another day.

The present disclosure is generally directed to multi-level navigation for media content. As will be explained in greater detail below, embodiments of the instant disclosure may facilitate navigation of media content (e.g., navigation of images, audio segments, video clips, text items, and so on via a user interface) by way of multiple organizational levels (e.g., via the individual media content items, via groups of individual media content items, and so on). By providing multi-level navigation, less traversing of the multiple levels may be necessary to view a number of media content items, possibly resulting in overall faster navigation of the media content items. Further, in some embodiments, the attention of the user may be focused on media content items that may be of particular interest, thus further enhancing the navigation process.

The following will provide, with reference to FIGS. 1-12, detailed descriptions of systems and methods providing multi-level navigation of media content. A description of embodiments employing navigation among and within media content groups and corresponding group indicators is presented in conjunction with the user interface map of FIGS. 1 and 2. Similarly, a description of embodiments employing navigation among and within media content groups, along with corresponding item overviews and group indicators, is provided in connection with the user interface map of FIGS. 3 and 4. Descriptions of methods of multi-level navigation associated with the user interface maps of FIGS. 1-4 are set forth in combination with the flow diagrams of FIGS. 5 and 6. Embodiments of a computing system and a computing network configured to provide a user interface that facilitates multi-level navigation of media content are discussed in conjunction with FIGS. 7 and 8, respectively. A discussion of a possible three-level user interface that may employ multi-level navigation is provided in combination with FIGS. 9-12.

Figure 2:
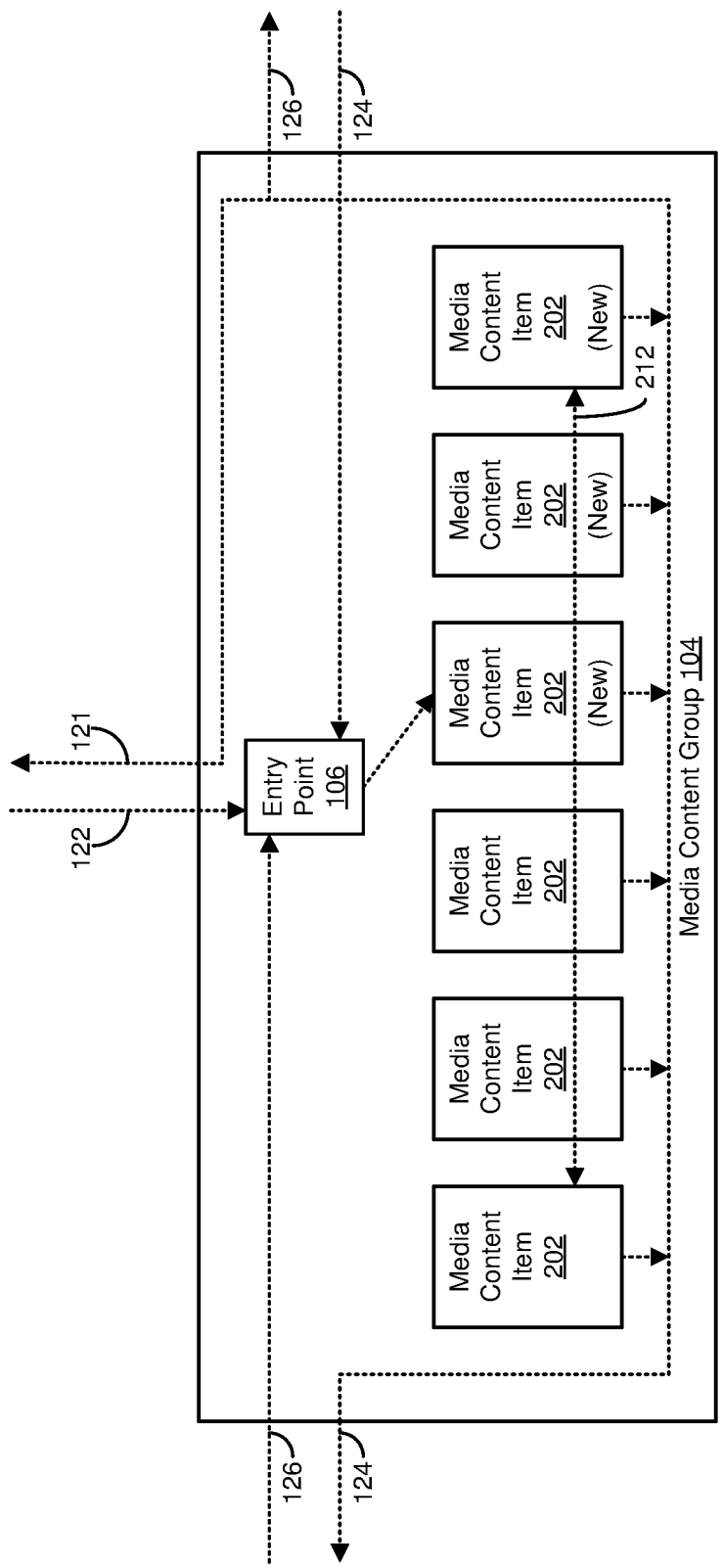
FIG. 2 is a diagram of a portion of the exemplary user interface map of FIG. 1 covering navigation within one of the groups of media content items.

FIGS. 1 and 2 jointly illustrate a user interface map 100 depicting potential navigational pathways (e.g., as may be employed in a user interface) for multiple media content groups 104, each of which may include one or more media content items 202, as well as a plurality of group indicators 102 associated with media content groups 104. In some embodiments, user interface map 100 may be viewed as a kind of two-level user interface presented by media content groups 104 and associated group indicators 102. In the particular example of FIGS. 1 and 2, six media content groups 104 and their corresponding group indicators 102 are depicted, along with six media content items 202 residing within at least one media content group 104. However, any number of media content groups 104, with varying numbers of media content items 202 in each media content group 104, may be present in other examples. In some embodiments, media content items 202 may include any type of visual and/or audio content, including, but not limited to, still images (e.g., photos, sketches, and so on), audio segments (e.g., songs, podcast items, and the like), video clips (e.g., music videos, animated GIFs (Graphics Interchange Format), personal videos, and so forth), text (e.g., news articles, personal messages, and so on, possibly including emoticons and other graphics), and more. In some examples described more fully below, each media content item 202 may represent a post or submission to media content group 104. Moreover, in some embodiment, each media content group 104 may represent a content "channel," access to which may be limited to some predefined group of people or subscribers. Examples of such channels and posts are discussed below in connection with FIGS. 9-12. However, the various embodiments described herein providing multi-level navigation are not limited to the channel embodiments described below, buy may be applicable to many different types of media content items that are organized or grouped in some manner.

Additionally, in some embodiments, user interface map 100, as well as other embodiments described below, may be designed for small-format user interfaces, such as those employable on mobile devices (e.g., smartphones, tablet computers, and the like). However, embodiments of user interfaces utilizing multi-level navigation for media content, as discussed herein, are not limited to mobile devices, but may be used in other computing systems, such as desktop computers, laptop computers, and so on.

As depicted in FIG. 1, each media content group 104 may correspond with an associated group indicator 102. In some examples, group indicator 102 may be some graphical, textual, and/or other indication, icon, or representation of its corresponding media content group 104. In some examples, group indicator 102 may include one or more of an image, text, or other type information indicating one or more characteristics of its corresponding media content group 104, such as a group name, group creator, group time frame (e.g., date and/or time), and so on. With respect to embodiments in which media content group 104 is a content channel, as described above, associated group indicator 102 may include or indicate one or more of a channel name, channel creator, channel audience, channel type, and the like.

As shown in FIGS. 1 and 2, dashed lines depict various links or pathways that facilitate navigation among group indicators 102, as well as among and within media content groups 104. In some examples, a first navigational path 112 may link group indicators 102 sequentially (e.g., such that a user may navigate from one group indicator 102 to the next in the order determined by first navigational path 112). In some examples, a particular order in which group indicators 102 are aligned along first navigational path 112 may be determined according to any method or process, such as chronologically by which each media content group 104 was created, manually by a user, automatically based on user preferences, automatically according to overall popularity of each corresponding media content group 104, and so forth. While first navigational path 112 is shown as a linear arrangement of group indicators 102, other embodiments may also allow direct navigation between leftmost and rightmost group indicators 102, thus facilitating a circular version of first navigational path 112.

In some examples, group indicators 102 may be presented in a user interface as a kind of channel feed in which one or more group indicators 102 may be viewed at a time, where one or more may be selected by a user. In other examples, only one group indicator 102 may be in "focus" at a time, and thus available for user selection. Also, in some embodiments, group indicators 102 may be navigated along first navigational path 112 by way of scrolling along a particular direction (e.g., vertically) so that the user may quickly review the group indicators 102 available for selection.

Each group indicator 102 may be associated with or indicative of a corresponding media content group 104. Moreover, each media content group 104 may include a second navigational path 212 linking the one or more media content items 202 of media content group 104 sequentially, as depicted in FIG. 2. As with first navigational path 112, second navigational path 212 may form a strictly linear path, as shown in FIG. 2, or may additionally link leftmost and rightmost media content items 202 to form a circular second navigational path 212. In some examples, an order in which media content items 202 of media content group 104 are aligned along second navigational path 212 may be determined based on any method or process, such as chronologically by which each media content item 202 was added to media content group 104, manually by a user, automatically based on user preferences, automatically based on overall popularity of each corresponding media content item 202, and so forth.

In some embodiments, media content items 202 of media content group 104 may be presented in a graphical user interface as a kind of post listing in which one or more media content items 202 may be viewed at a time, where one or more may be selected by a user. In other examples, only one media content item 202 may be in focus or in view at a time. Also, in some embodiments, media content items 202 may be navigated along second navigational path 212 by way of scrolling along a particular direction (e.g., in a different direction from the presentation of group indicators 102, such as horizontally) so that the user may rapidly review the media content items 202 available for viewing and/or selection.

As illustrated in FIGS. 1 and 2, each group indicator 102 and corresponding media content group 104 may be navigated therebetween by way of a first navigational link 121 from media content group 104 to group indicator 102 and a second navigational link 122 from group indicator 102 to a group entry point 106 of media content group 104. In some embodiments, as shown more completely in FIG. 2, first navigational link 121 may be employed to navigate directly from any media content item 202 of media content group 104 to group indicator 102. In some examples, a user may employ such navigation by swiping the currently shown media content item 202 (e.g., vertically), tapping or clicking a particular area of the currently shown media content item 202, or activating some other portion of the user interface.

In some embodiments, second navigational link 122 may provide a different path from those provided via first navigational link 121. More specifically, group entry point 106 may provide a navigational link to one of the media content items 202 of media content group 104 at a time. For example, as shown in FIG. 2, group entry point 106 may provide a link to a first of one or more newly added media content items 202 of media content group 104. In embodiments in which media content items 202 are added to media content group 104 along second navigational path 212 chronologically, use of group entry point 106 in such a manner may allow navigation thereafter to newer media content items 202 within media content group 104 in one direction (e.g., to the right) and to older media content items 202 (e.g., to the left). In some examples (e.g., after viewing of the newer media content items 202, after closing the user interface associated with the media content items 202, addition of even newer media content items 202, or based on some other event), group entry point 106 may be altered to link to another of media content items 202 (e.g., a first of the newer media content items 202). In yet other examples, some other method or process may be employed to determine to which media content item 202 group entry point 106 provides a link from outside media content group 104.

In some embodiments, in addition to group indicator 102 employing group entry point 106 of a corresponding media content group 104 to navigate thereto using second navigational link 122, group entry point 106 may also be used by one or both media content groups 104 adjacent the corresponding media content group 104 (e.g., as specified by the order of group indicators 102 along first navigational path 112). For example, as depicted in FIG. 2, a user may navigate from one or more media content items 202 of media content group 104 using a third navigational link 124 to group entry point 106 of a preceding media content group 104. Similarly, the user may navigate from one or more media content items 202 of media content group 104 using a fourth navigational link 126 to group entry point 106 of a following media content group 104. Accordingly, group entry point 106 of the same media content group 104 may be navigated thereto from one or more media content items 202 of a following media content group 104 using a separate third navigational link 124 and/or from one or more media content items 202 of a preceding media content group 104 using a separate fourth navigational link 126.

In some examples, the user may navigate within a user interface by way of first navigational links 121, second navigational links 122, third navigational links 124, and fourth navigational links 126, as well as first navigational path 112 and second navigational paths 212, using swipes, taps, clicks, and/or other user interactions as provided by the particular user interface that implements user interface map 100.

Figure 3:
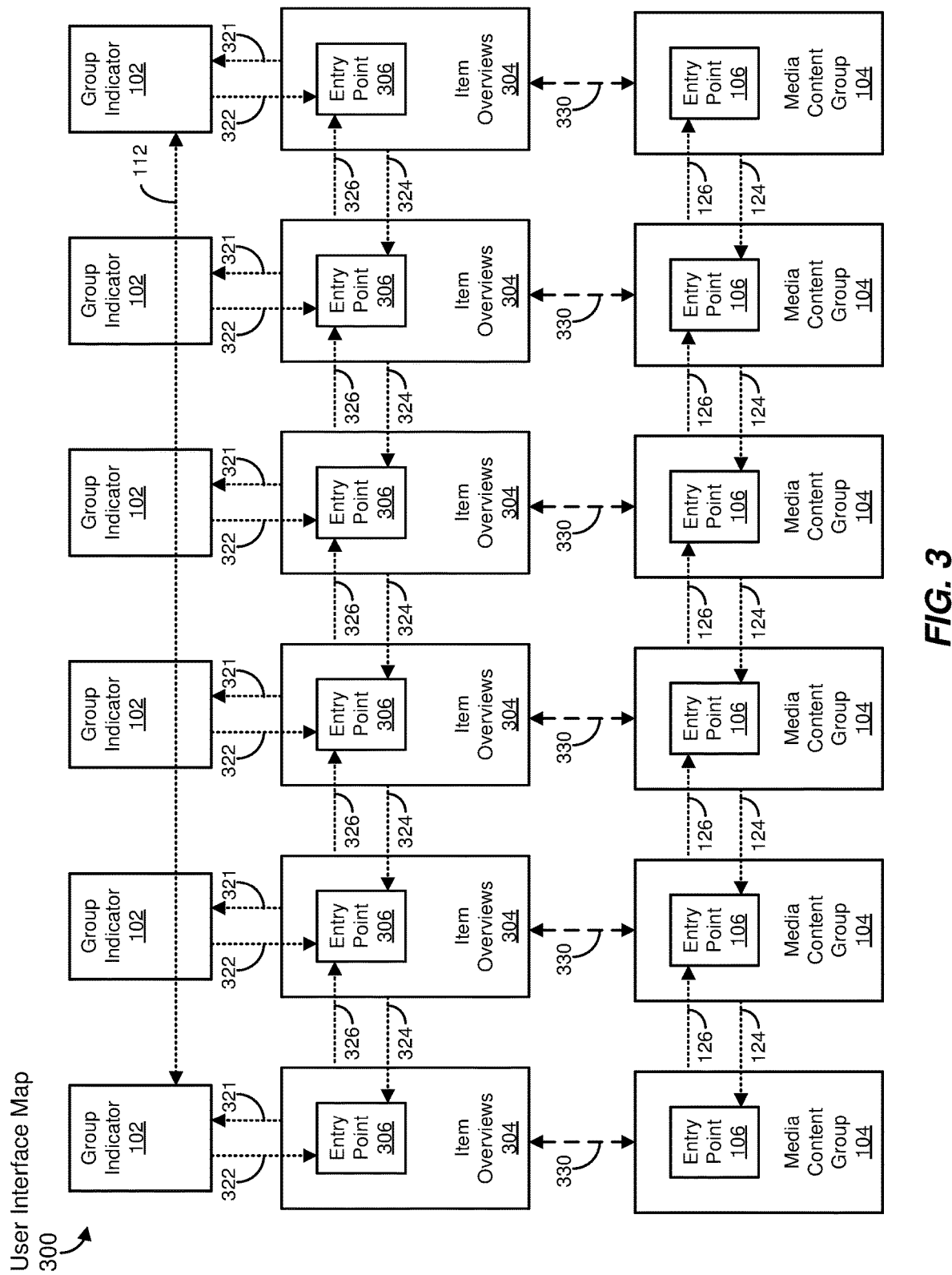
FIG. 3 is a diagram of an exemplary user interface map illustrating multi-level navigation among groups of media content items, corresponding item overviews, and corresponding group indicators.
Figure 4:
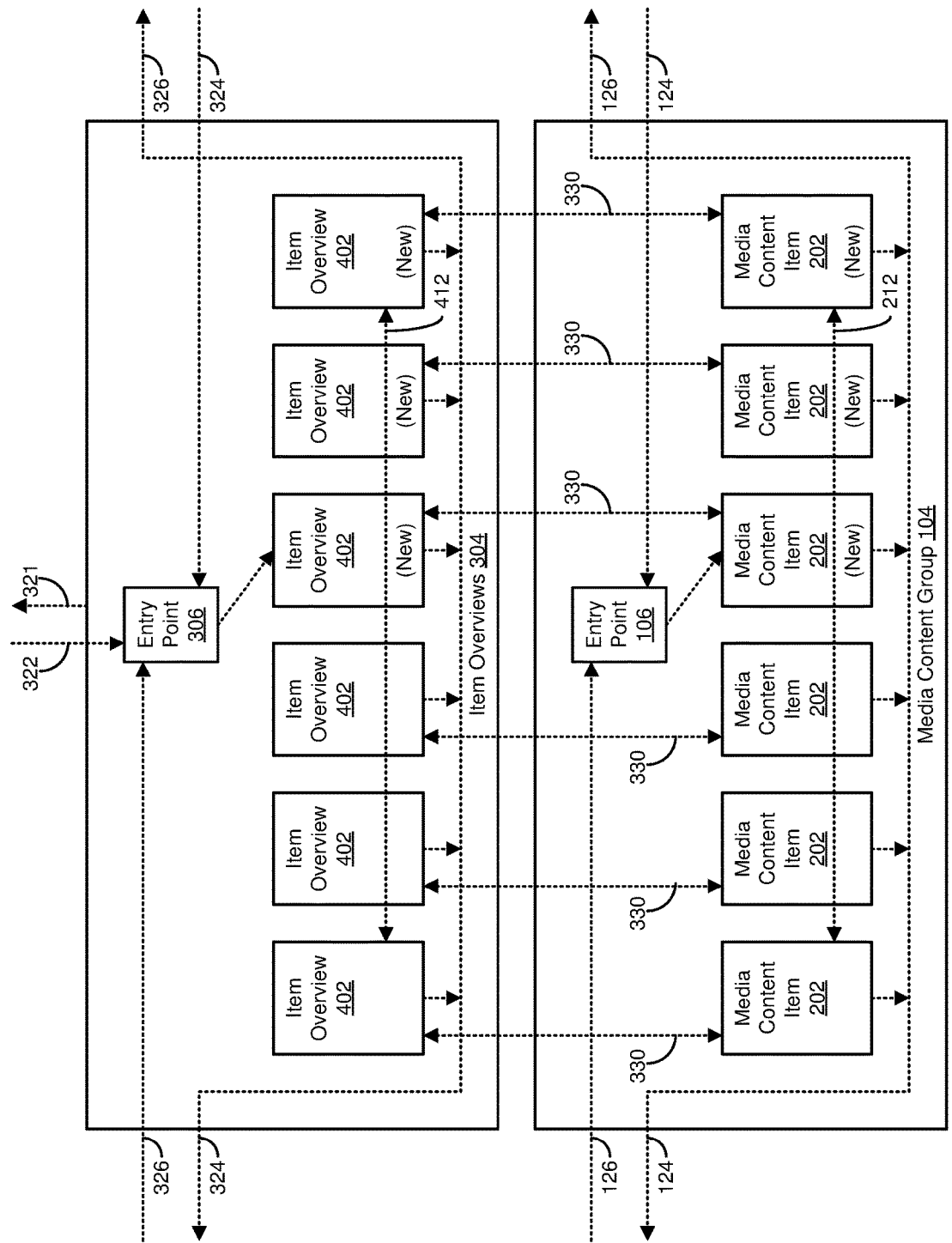
FIG. 4 is a diagram of a portion of the exemplary user interface map of FIG. 3 covering navigation within one of the groups of media content items and corresponding item overviews.

FIGS. 3 and 4 jointly depict a user interface map 300 illustrating potential navigational pathways for multiple media content groups 104 and corresponding group indicators, as indicated above with respect to FIGS. 1 and 2. Additionally, associated with each media content item 202 of each media content group 104 may be a corresponding item overview 304. As shown in FIGS. 3 and 4, item overviews 304 corresponding to a particular media content group 104 reside in user interface map 300 between the corresponding media content group 104 and associated group indicator 102. In some embodiments, item overviews 304, as displayed in the user interface, may visually provide a third organizational level providing some user orientation between group indicators 102 and media content items 202 of media content groups 104. For example, each item overview 304 may provide some thumbnail or other summary representation of its corresponding media content item 202, along with some additional information describing media content group 104 (e.g., a creator name, an indication of those users allowed to access media content group 104, the number of media content items 202 in media content group 104, the number of media content items 202 recently added to media content group 104, etc.), thus relating each media content item 202 to its overall media content group 104.

As illustrated in FIGS. 3 and 4, first navigational path 112 may link group indicators 102 sequentially, and second navigational paths 212 link media content items 202 sequentially within each media content group 104 (e.g., as shown in FIG. 1). Similarly, in some embodiments, item overviews 402 associated with a particular media content group 104 may be linked sequentially via a third navigational path 412 (e.g., in the same order as corresponding media content items 202 of media content group 104 are linked via second navigational path 212).

Also, as indicated in FIGS. 3 and 4, group entry point 106 may link to one media content item 202 in media content group 104 (e.g., as illustrated in FIGS. 1 and 2). Further, group entry point 106 may be employed to navigate from one or more media content items 202 of a following media content group 104 (e.g., by way of third navigational link 124) and may be employed to navigate from one or more media content items 202 of a preceding media content group 104 (e.g., via fourth navigational link 126), as previously indicated above in FIGS. 1 and 2.

In some examples, item overviews 402 associated with a particular media content group 104 facilitate similar navigational paths and links as those associated with media content groups 104, as discussed earlier. For example, each group indicator 102 may be linked with corresponding item overviews 304 by way of a fifth navigational link 321 and a sixth navigational link 322 in a fashion similar to how first navigational link 121 and second navigational link 122 of FIGS. 1 and 2 couple group indicator 102 to media content items 202 of corresponding media content group 104. Moreover, in some examples, a group overview entry point 306 may link to one of multiple item overviews 402 associated with media content group 104 in a manner similar to that of group entry point 106 linking to one of multiple media content items 202 of media content group 104. In some embodiments, the item overview 402 linked by group overview entry point 306 may correspond to the same media content item 202 linked by group entry point 106 of that same media content group 104. Consequently, when group entry point 106 is updated to link to another media content item 202 (e.g., a media content item 202 newly added to media content group 104), group overview entry point 306 may also be updated to link to item overview 402 that corresponds with the newly linked media content item 202. Additionally, group overview entry point 306 may be employed to navigate from one or more item overviews 402 associated with a following media content group 104 by way of a seventh navigational link 324. Further, group overview entry point 306 may be employed to navigate from one or more item overviews 402 associated with a preceding media content group 104 by way of an eighth navigational link 326.

As each media content item 202 may be associated with a single item overview 402 that provides information related to that media content item 202 and corresponding media content group 104, each media content item 202 may be bidirectionally linked to associated item overview 402 by way of a corresponding media content item link 330. In such examples, navigation between the second level item overviews 402 and the third level media content items 202 via corresponding media content item link 330 may provide guidance to the user regarding the current level, current media content item 202, and current media content group 104 with which the user is current interacting. Additionally, in some examples (e.g., to emphasize the association of item overviews 402 with media content items 202), a user navigating along second navigational path 212 may employ a similar interface action (e.g., swiping left and right) as when navigating along third navigational path 412. Further, navigating along either second navigational path 212 or third navigational path 412 may involve a different interface action than that used when navigating along first navigational path 112 (e.g., swiping up and down).

While the examples of FIGS. 1-4 illustrate two-level and three-level interface maps, interface maps including more that three conceptual or organizational levels may benefit from application of the various concepts described herein.

Figure 5:
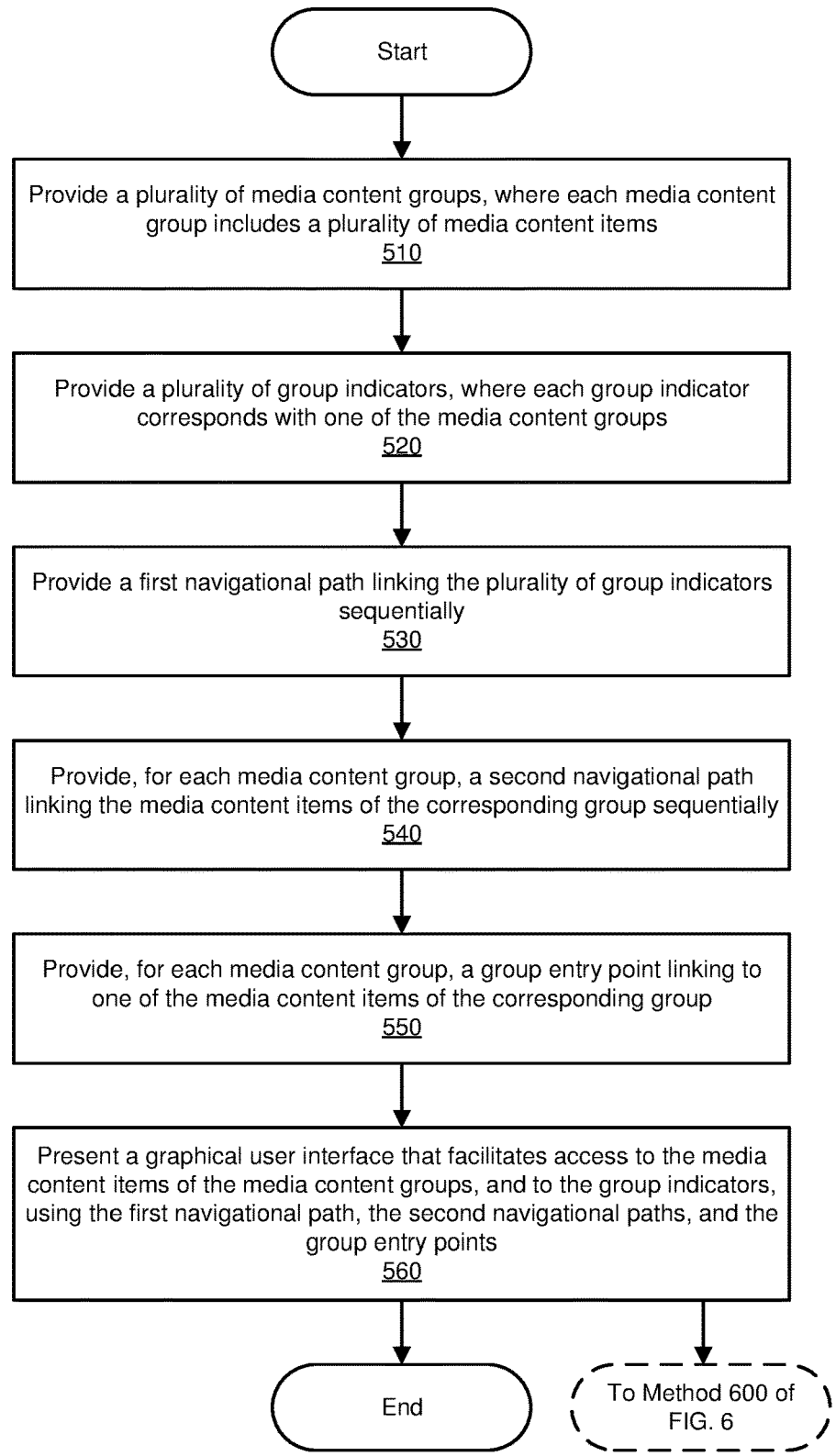
FIG. 5 is a flow diagram of an exemplary method of providing multi-level navigation among groups of media content items and corresponding group indicators.
Figure 6:
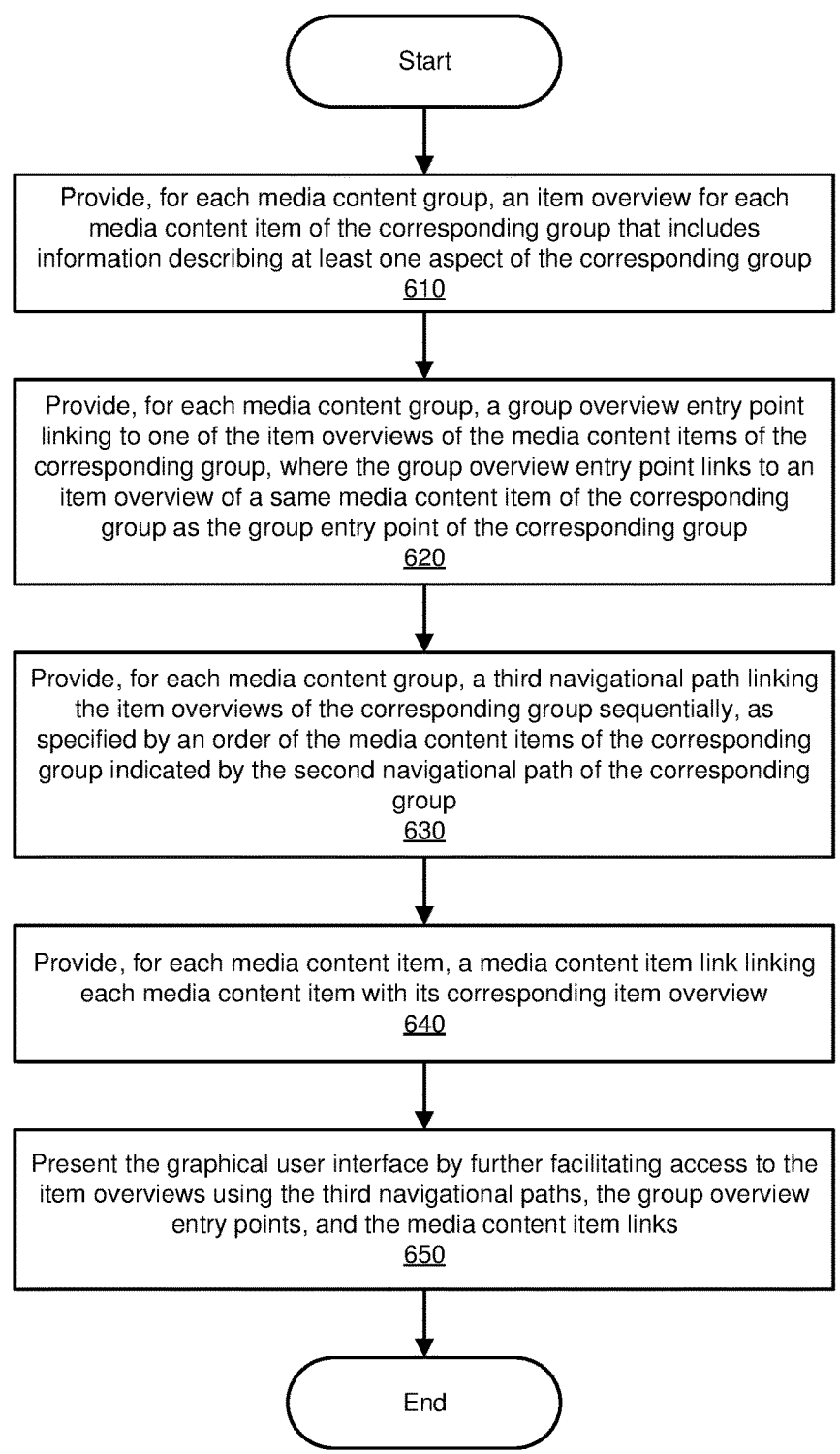
FIG. 6 is a flow diagram of an exemplary method, in conjunction with the method of FIG. 5, of providing multi-level navigation groups of media content items, corresponding item overviews, and corresponding group indicators.

FIGS. 5 and 6 are flow diagrams of exemplary computer-implemented methods 500 and 600, respectively, for multi-level media content navigation. More specifically, method 500 is generally directed to facilitating navigation of a two-level interface for media content (e.g., as described above in conjunction with FIGS. 1 and 2), while the combination of method 500 and method 600 is directed to facilitating three-level navigation (e.g., in accordance with FIGS. 3 and 4). The steps shown in FIGS. 5 and 6 may be performed by any suitable computer-executable code and/or computing system, including the system(s) illustrated in FIGS. 7 and 8, described below. In one example, each of the steps shown in FIGS. 5 and 6 may represent an algorithm whose structure includes and/or is represented by multiple sub-steps, examples of which are provided in greater detail herein.

As illustrated in FIG. 5, at step 510, a plurality of media content groups (e.g., media content groups 104) may be provided, where each media content group may include a plurality of media content items (e.g., media content items 202). Additionally, at step 520, a plurality of group indicators (e.g., group indicators 102) may be provided, where each group indicator corresponds with one of the media content groups.

At step 530, in some embodiments, a first navigational path (e.g., first navigational path 112) may be provided that links the plurality of group indicators sequentially. Moreover, at step 540, a second navigational path (e.g., second navigational path 212) may be provided for each media content group that links the media content items of the corresponding media content group. In addition, at step 550, a group entry point (e.g., group entry point 106) may be provided for each media content group that may link to one of the media content items of the corresponding media content group.

At step 560, a graphical user interface may be presented that facilitates access to the media content items of the media content groups, and to the group indicators, using the first and second navigational paths and the group entry points. In some examples, navigational links with the group entry points from the group indicators and adjacent media content groups, as well as navigational links from the media content groups to the group indicators, may also be implemented, as described above in relation to FIGS. 1 and 2.

In some embodiments, method 600 may be employed to provide an intermediate overview level between the group indicators and the media content groups, as depicted in FIGS. 3 and 4. At step 610, for example, for media content group, an item overview (e.g., item overview 402) may be provided for each media content item of the corresponding media content group that includes information describing at least one aspect of that group. At step 620, a group overview entry point (e.g., group overview entry point 306) may be provided for each media content group that links to one of the item overviews of the media content items of the corresponding media content group. In some embodiments, the group overview entry point links to an item overview of the same media content item of the corresponding media content group as the group entry point of that group.

At step 630, for each media content group, a third navigational path (e.g., third navigational path 412) may be provided that links the item overviews of the corresponding media content group sequentially. In some examples, the sequential linking may be specified by an order of the media content items of the corresponding media content group indicated by the second navigational path of that group. Additionally, at step 640, for each media content item, a media content item link (e.g., media content item link 330) may be provided that links (e.g., bidirectionally) each media content item with its corresponding item overview.

At step 650, the graphical user interface may further facilitate access to the item overviews using the third navigational paths, the group overview entry points, and the media content item links. Additionally, in some embodiments, navigational links with the group overview entry points from the group indicators and the item overviews of adjacent media content groups, as well as navigational links from the item overviews to the group indicators, may also be implemented, as discussed above in connection with FIGS. 3 and 4.

Figure 7:
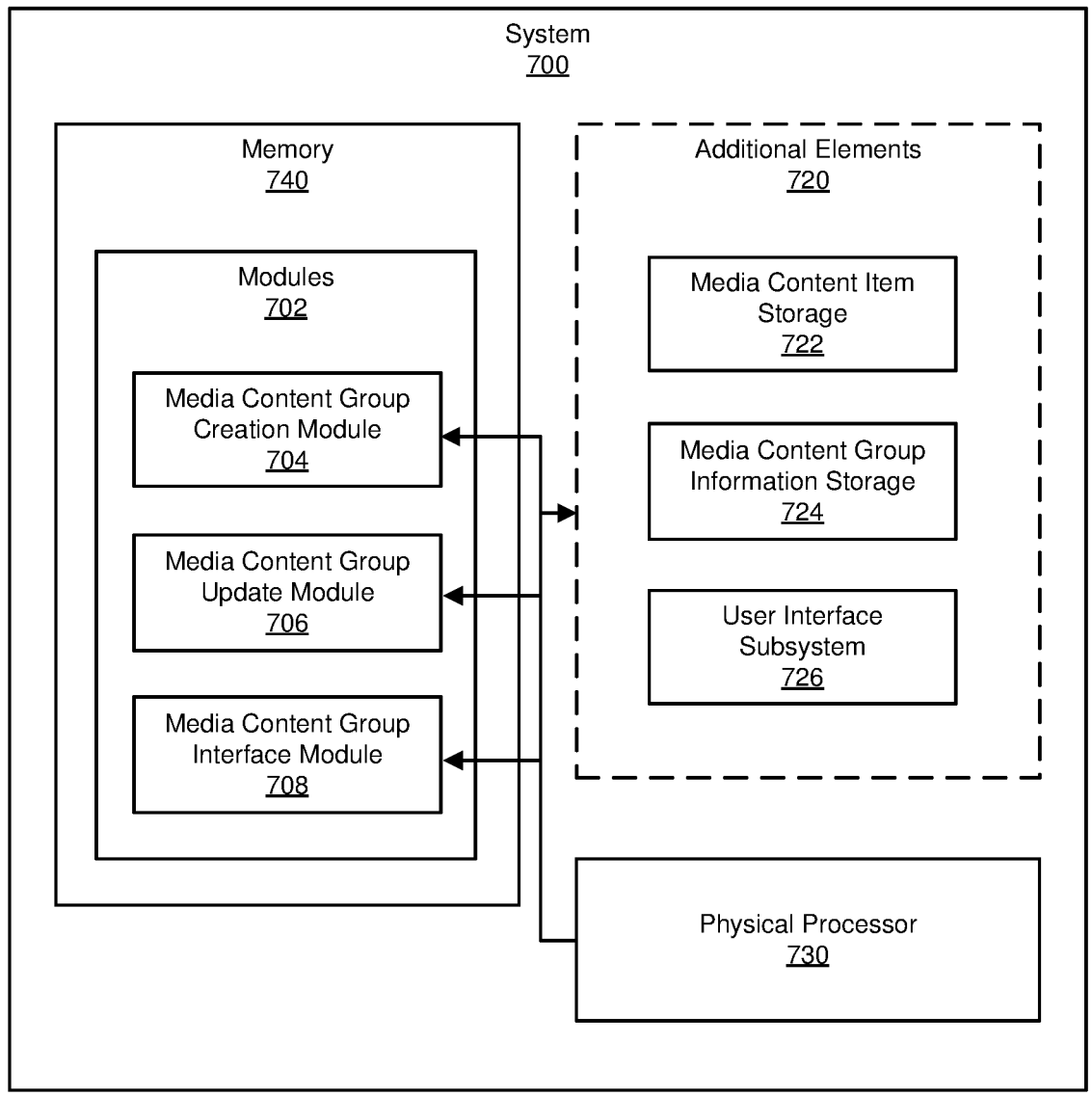
FIG. 7 is a block diagram of an exemplary computing system providing multi-level navigation of media content.

FIG. 7 is a block diagram of a computing system 700 (e.g., a desktop computer, a laptop computer, a tablet computer, a smartphone, and the like) may include modules 702 stored in a memory 740, where each module 702 may include instructions executable by at least one physical processor 730 to perform various operations, such as those described above in conjunction with FIGS. 1-6. Modules 702 may include a media content group creation module 704, a media content group update module 706, and a media content group interface module 708.

In some embodiments, media content group creation module 704 may facilitate user creation of one or more media content groups. Such creation may include, for example, selecting the group of people that are authorized to access the media content group, the types of media content that may be added to the media content group, and so on. Additionally, in some examples, media content group creation module 704 may also facilitate removal of one or more media content groups.

Media content group update module 706, in some embodiments, may facilitate user addition and/or removal of media content items from one or more media content groups. Further, media content group update module 706 may allow the user to annotate (e.g., with graphics, comments, and so on) media content items of the groups.

In some embodiments, media content group interface module 708 may display a user interface that presents a representation of the group indicators, media content items, item overviews, and other aspects of a graphical user interface for facilitating access to the media content items. Additionally, media content group interface module 708 may provide the various navigational paths, links, and entry points described above to allow the user to navigate among the group indicators, media content items, item overviews, and the like described above in conjunction with user interface maps 100 and 300.

System 700 may also include additional elements 720, including but not limited to media content item storage 722, media content group information storage 724, and user interface subsystem 726. In some embodiments, media content item storage 722 may store the media content items (e.g., images, audio segments, video clips, and so on) that may be included in the media content groups described above. Media content group information storage 724 may store information describing one or more or aspects of the media content groups (e.g., group creator, users allowed to access the group, and the like). User interface subsystem 726 may include any hardware (e.g., visual display, user input devices, graphics cards, and so on) and/or software that may cause the display of, and facilitate user interaction with, the graphical user interfaces described herein, including the user interface maps 100 and 300, and any additions or modifications described above.

Figure 8:
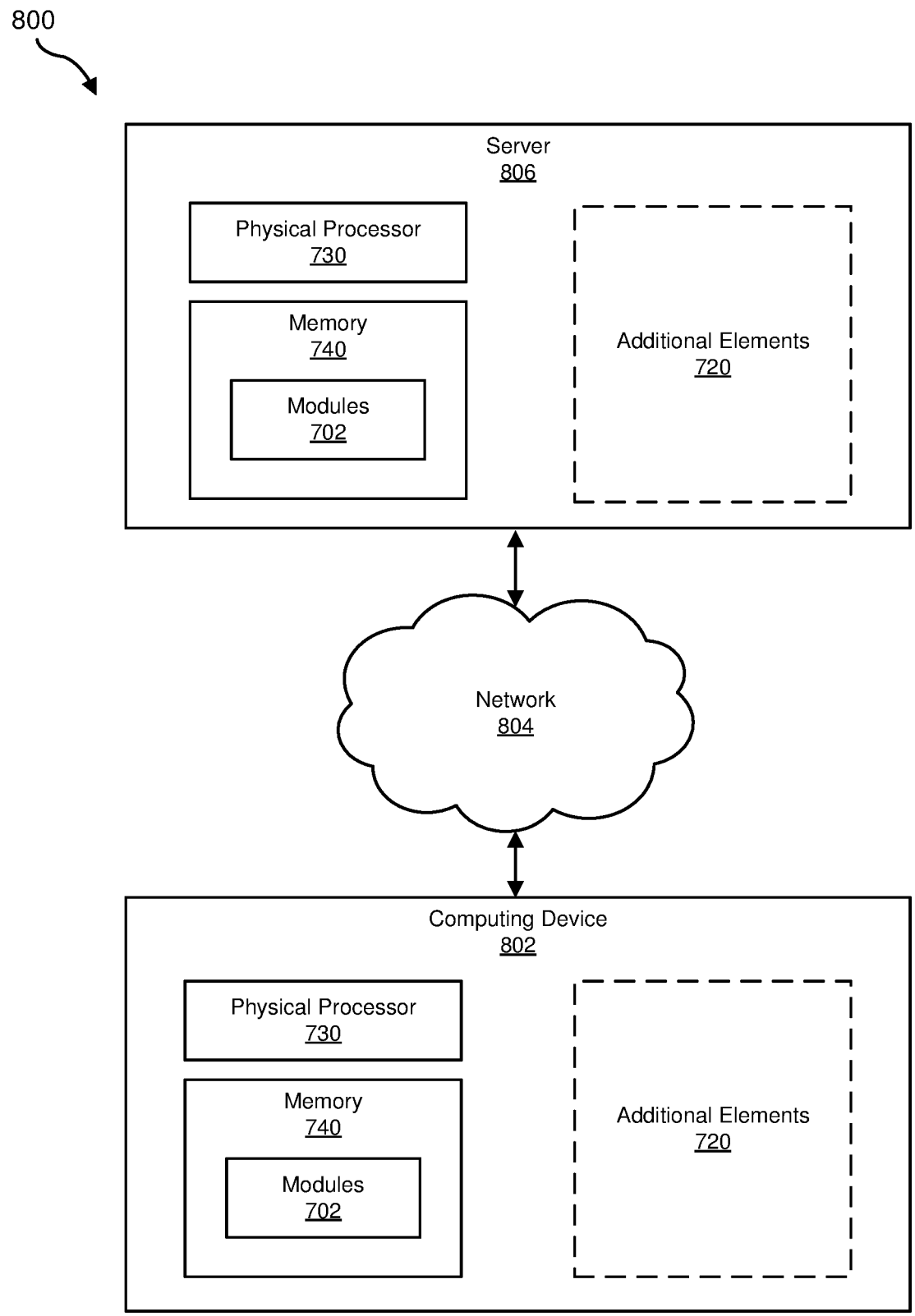
FIG. 8 is a block diagram of an exemplary computing network providing multi-level navigation of media content.

FIG. 8 is a block diagram of a network computing system 800 that may perform the various operations described above in conjunction with FIGS. 1-6. In some embodiments, one or more modules 702 and additional elements 720 may be employed in either or both of a computing device 802 and a server 806 communicatively coupled by way of a network 804. In some examples, portions of media content item storage 722 and/or media content group information storage 724 may be stored at server 806 for access by one or more computing devices 802 for presentation to users of those devices.

FIGS. 9-12 are illustrations of a user interface that provides access to multiple media content groups that are referred in some embodiments as content "channels," where each channel may contain one or more media content items referred to as "posts," as mentioned above. In some examples, many different users may create many different content channels, where the user that creates a channel may decide which other users (e.g., friends, family members, and the like) may view the created channel and its posts. Users may also select which content channels they want to view (e.g., from among those content channels that are available to that user). Each user may select to follow individual channels, groups of channels, all channels of a given user, only some channels of a given user, and so on. In some embodiments, when the content channels are published and made available on a content platform (e.g., a dedicated desktop or smartphone application, a website accessible via a browser application, and so forth), users may be able to browse the channels and associated posts at multiple levels of access, as described in detail above. While FIGS. 9-12 are illustrations of a graphical user interface provided on a smartphone, other computing devices or systems may present a graphical user interface possessing various characteristics described herein.

Figure 9:
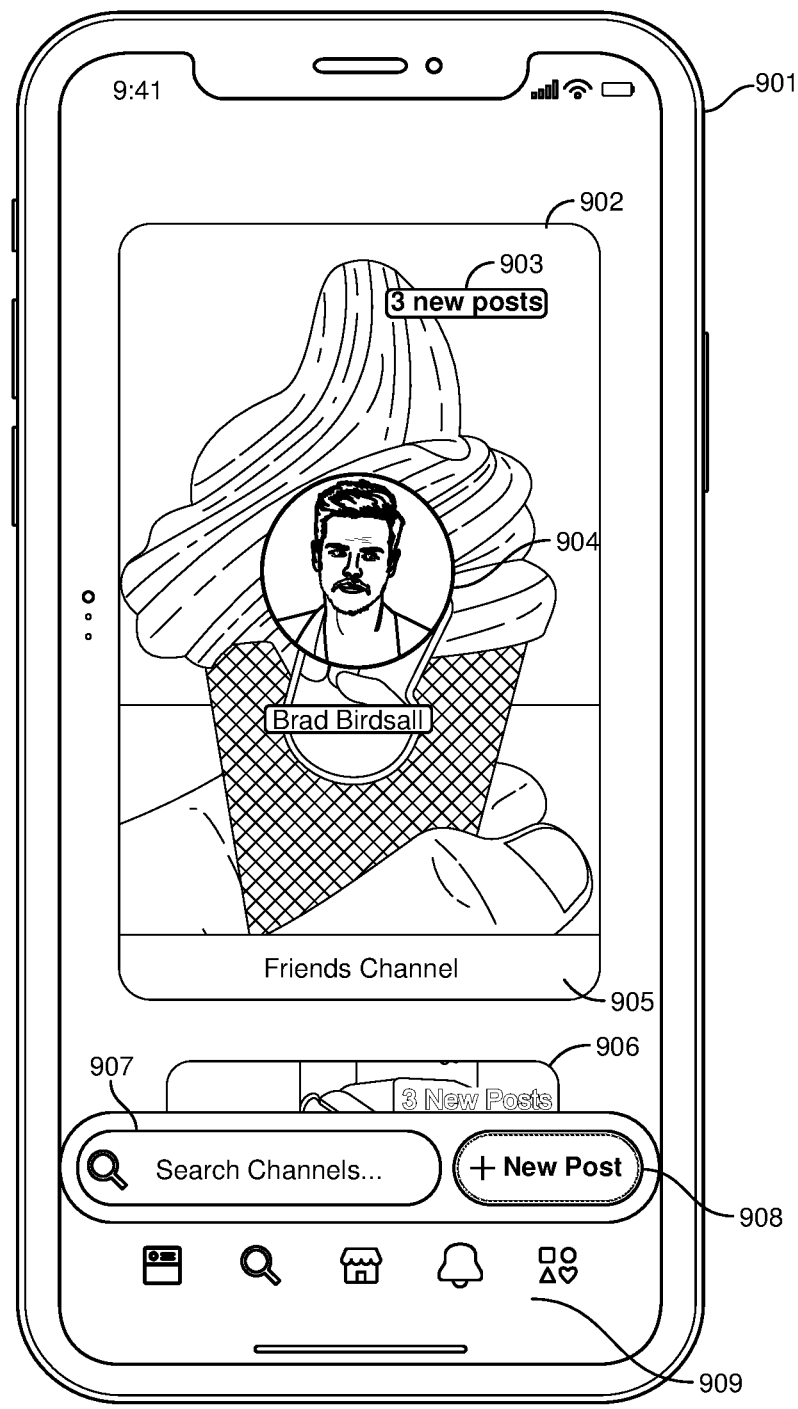
FIG. 9 is an illustration of a graphical user interface presenting a group indicator shown in a channel feed of multiple content channels.

FIG. 9 is an illustration of a graphical user interface of a smartphone 901 presenting a channel indicator 902 (e.g., serving as a group indicator) as one of several channel indicators of a channel feed. In this example, at the channel feed level, the graphical user interface may present channel indicators 902 and 906, along with potentially other channel indicators. The user may be able to navigate through the channel feed of different channel indicators 902, 906 sequentially (e.g., by swiping vertically) and select which channel they currently wish to view (e.g., by tapping the associated channel indicator 902, by voice command selecting channel indicator 902, or the like). As shown in FIG. 9, channel indicator 902 may provide information related to the particular content channel, such as a channel creator 904 (e.g., "Brad Birdsall," which may include an image or icon representative of channel creator 904), a user group 905 allowed to view the content channel (e.g., "Friends Channel"). In some examples, at least a portion of channel indicator 902 may display a post of the channel associated with channel indicator 902, such as a post that was recently added to the channel. Other graphical user interface interaction elements may include a search bar 907 for searching other channels available in the channel feed, a new post button 908 to facilitate addition of a new post to the content channel by the user, and an array of other interaction elements 909 that may allow the user to interact with the channels and/or associated posts. If a user selects content channel indicator 902, the graphical user interface, in response, may present a channel overview level that may show multiple overview items corresponding to particular posts associated with content channel indicator 902.

Figure 10:
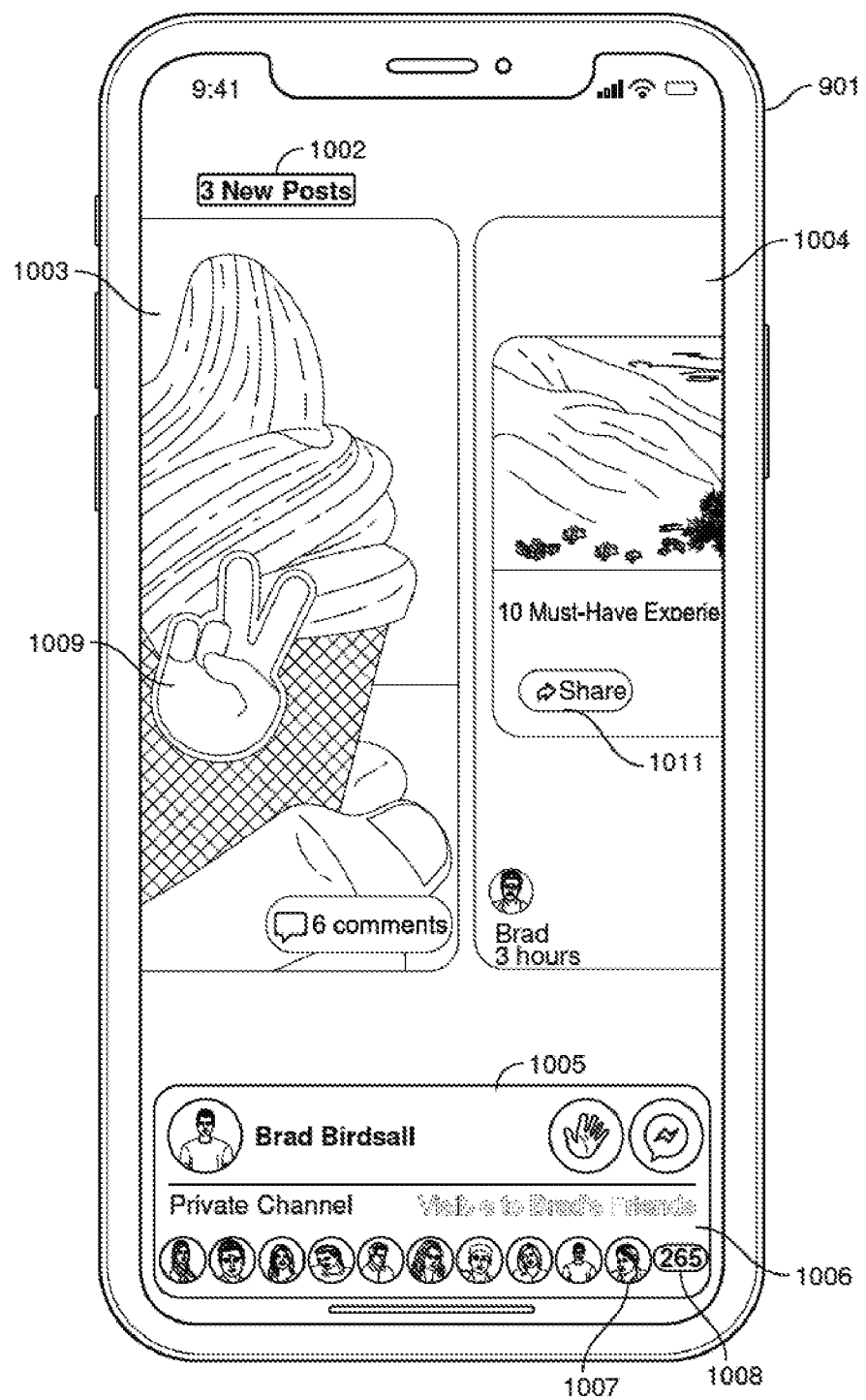
FIG. 10 is an illustration of a graphical user interface presenting post overviews of a selected content channel of the channel feed of FIG. 9.

FIG. 10 is an illustration of the graphical user interface presenting post overviews (e.g., serving as item overviews, as described above, representing a channel overview level) of selected content channel indicator 902. At this overview level, multiple post overviews (e.g., such as post overviews 1003, 1004, among others) may be presented and available for viewing by way of the user navigating post overviews (e.g., via swiping horizontally). In some embodiments, selecting content channel indicator 902 may cause the graphical user interface to present post overview 1003 in focus corresponding to a first of one or more newly added posts, as mentioned above. The user may then navigate to other post overviews, as suggested in FIG. 10.

In some examples, the user may add stickers 1009, may share the post via a share button 1011, or may otherwise interact with each post from the overview level. The user may also select a post overview (e.g., post overview 1004) from within the overview level and view that post individually and interact with the post directly.

From within the channel overview, the user may also be presented with information descriptive of the selected content channel, such as a new post indication 1002 indicating how many new posts are available within the channel, as well as a channel description area 1005 providing overall information pertaining to the selected channel (e.g., a user count 1008 indicating a number of users that may view the channel, a channel description 1006 indicating the type of channel (e.g., "Private Channel—Visible to Brad's Friends"), and user icons 1007 of at least some users allowed to view the channel). In some embodiments, the user may employ channel description area 1005 (e.g., by swiping, tapping, or the like) to navigate to an overview of another (e.g., adjacent) content channel directly from the current overview (e.g., by way of an item overview entry point, as discussed above).

In this manner, content channels may be presented on at least two different interface levels including the channel feed level and the channel overview level. From within the channel feed level, the user may select a channel to view, and from within the channel overview level, the user may select a post to view. At each hierarchical or organizational level, the user may be able to interact with the channel and/or with the post in different ways, each of which may be configurable in policies. In some embodiments, users may only be able to respond to a given post (e.g., by viewing and writing comments or responses to comments) at the post level. In other embodiments, users may also be able to respond to posts from within the channel overview level.

Figure 11:
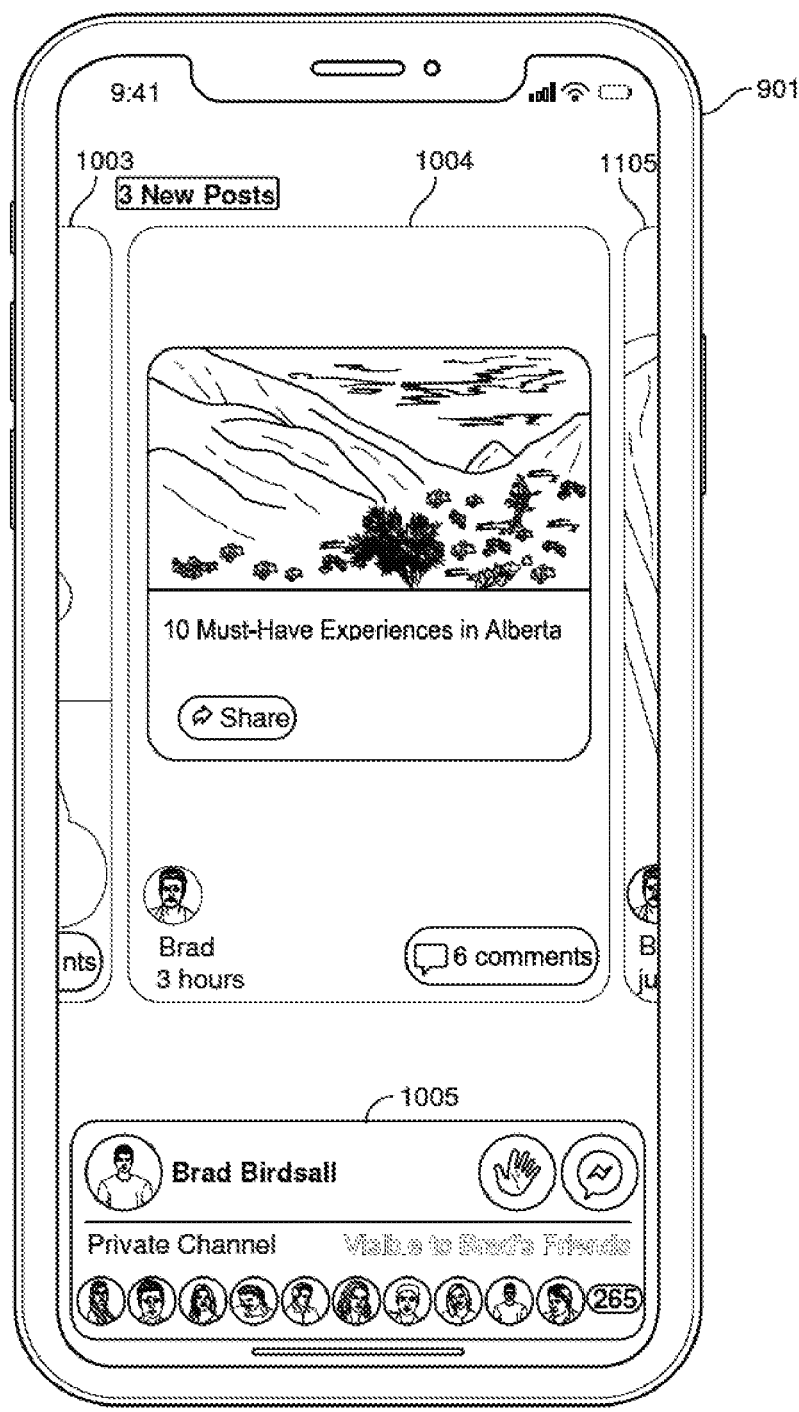
FIG. 11 is an illustration of a graphical user interface presenting a focused post overview of the selected content channel of the channel feed of FIG. 9.

FIG. 11 is an illustration of the graphical user interface presenting a focused item overview (e.g., post overview 1004) during user navigation at the overview level. In this example, other post overviews 1003, 1105 may be partially shown, and subsequently navigated to, within the graphical user interface as part of an overall post overview sequence. In some embodiments, the user interface may allow the user to navigate to another post overview 1003, 1105 (e.g., by swiping horizontally), to navigate back to the channel feed (e.g., by dragging one of post overviews 1003, 1004, 1105 downward or upward), to navigate to a sequence of post overviews corresponding to another content channel (e.g., by swiping or otherwise interacting with channel description area 1005, or by swiping past the first or last post overview), or to navigate to the particular post corresponding to post overview 1004 (e.g., by tapping post overview 1004). Other navigational choices involving the post overviews may also be possible in other embodiments, as described above.

Figure 12:
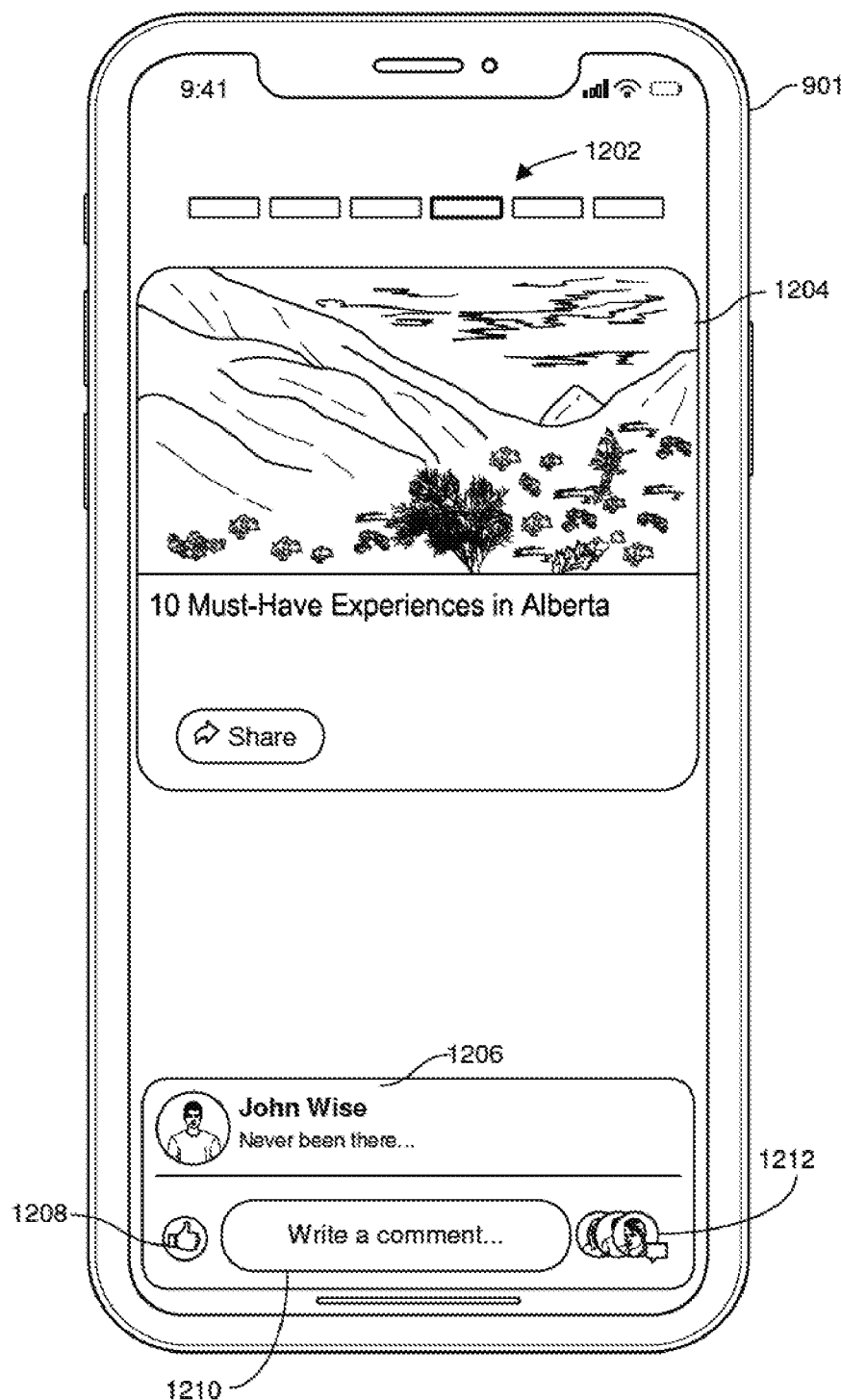
FIG. 12 is an illustration of a graphical user interface presenting a post associated with the post overview of FIG. 11.

FIG. 12 is an illustration of the graphical user interface presenting a post 1204 (e.g., a media content item, as discussed above) corresponding to selected post overview 1004. In some examples, post 1204 may consume a larger area of the user interface relative to post overview 1004 to provide greater ease of viewing and interaction with post 1204. Also, in some embodiments, a post sequence indicator 1202 (e.g., a series of icons with one or more highlighted) may be displayed that indicates a relative position of post 1204 within the content channel. In a bottom portion of the graphical user interface, information specifically related to post 1204 may be provided (e.g., a highlighted comment 1206 regarding post 1204, a like button 1208 for a user to like the post, a comment area 1210 into which the user may enter a comment regarding post 1204, and a comment indicator 1212 indicating those other users who have already commented on post 1204).

In some embodiments, the user may navigate to other posts of the current channel (e.g., by swiping left or right), may navigate to post overview 1004 corresponding to post 1204 (e.g., by swiping upward or downward), or may navigate to a sequence of posts corresponding to another content channel (e.g., by tapping or otherwise interacting with post 1204, or by swiping past the first or last post). Other navigational choices involving the posts may also be possible in other examples, as noted above.

As discussed above in conjunction with FIGS. 1-12, multi-level navigation of media content may enhance a user's enjoyment in accessing a plurality of media content items (e.g., items that are organized into multiple groups) by allowing navigation at each of multiple levels of the user interface being employed to access the content. For example, such navigation may prevent at least some navigation from one level to another while navigating from one media content group to another. Additionally, in some embodiments, proceeding from one group to another at a lower level (e.g., at a media content item level or an associated overview level) of the user interface may direct the user to media content items that may be of relatively higher interest to the user, such as media content items that have been recently added to its corresponding group.

In one example, a computer-implemented method for multi-level navigation may include (1) providing a plurality of media content groups, where each media content group includes a plurality of media content items, (2) providing a plurality of group indicators, where each group indicator corresponds with one of the media content groups, (3) providing a first navigational path linking the plurality of group indicators sequentially, (4) providing, for each media content group, a second navigational path linking the media content items of the corresponding media content group sequentially, (5) providing, for each media content group, a group entry point linking to one of the media content items of the corresponding media content group, and (6) presenting a graphical user interface that facilitates access to the media content items of the media content groups, and to the group indicators, using the first navigational path, the second navigational paths, and the group entry points.

In some embodiments, the media content items of each media content group may be placed along the second navigational path of the corresponding media content group in an order in which each media content item was added to the corresponding media content group. In some examples, the group entry point for each of media content group may link to a first of a most recent set of media content items added to the corresponding media content group. In some embodiments, the group entry point for each media content group may be employable from the group indicator for the corresponding media content group. Also, in some examples, the group entry point for each media content group may be employable from any of the media content items of a preceding media content group, as specified by an order of the media content groups indicated by the first navigational path. Further, in some embodiments, the group entry point for each media content group may be employable from any of the media content items of a following media content group, as specified by an order of the media content groups indicated by the first navigational path.

In some embodiments, the method may further include altering, in response to a new media content item being added to one of the media content groups, the second navigational path of the corresponding media content group to include the new media content item. In some examples, the method may further include presenting, via the graphical user interface in response to a user navigating from a media content item of a first media content group to a media content item of a second media content group using the group entry point of the second media content group, an indication that the second media content group is being entered. In some embodiments, the method may include (1) facilitating procession along the first navigational path by swiping along a first direction of the graphical user interface, and (2) facilitating procession along the second navigational path by swiping along a second direction of the graphical user interface that is different from the first direction. In some examples, each of the media content groups may be associated with a particular group of users allowed to view the media content items of the corresponding media content group.

In other embodiments, the method may further include (1) providing, for each media content group, an item overview for each media content item of the corresponding media content group that includes information describing at least one aspect of the corresponding media content group, (2) providing, for each media content group, a group overview entry point linking to one of the item overviews of the media content items of the corresponding media content group, where the group overview entry point links to an item overview of a same media content item of the corresponding media content group as the group entry point of the corresponding media content group, (3) providing, for each media content group, a third navigational path linking the item overviews of the corresponding media content group sequentially, as specified by an order of the media content items of the corresponding media content group indicated by the second navigational path of the corresponding media content group, (4) providing, for each media content item, a media content item link linking each corresponding media content item with its corresponding item overview, and (5) where presenting the graphical user interface further includes facilitating access to the item overviews using the third navigational paths, the group overview entry points, and the media content item links.

In some embodiments, the group overview entry point for each media content group may be employed from the group indicator for the corresponding media content group. Further, in some examples, the group overview entry point for each media content group may be employed from any of the item overviews of a preceding media content group, as specified by an order of the media content groups indicated by the first navigational path. Also, in some examples, the group overview entry point for each media content group may be employed from any of the item overviews of a following media content group, as specified by an order of the media content groups indicated by the first navigational path.

In some embodiments, the method may further include presenting, via the graphical user interface in response to a user navigating from an item overview of a first media content group to an item overview of a second media content group using the group overview entry point of the second media content group, an indication that the second media content group is being entered. In some examples, the method may also include (1) facilitating procession along the first navigational path by swiping along a first direction of the graphical user interface, (2) facilitating procession along the second navigational path by swiping along a second direction of the graphical user interface that is different from the first direction, and (3) facilitating procession along the third navigational path by swiping along the second direction of the graphical user interface.

In one example, a system may include (1) a user interface subsystem, (2) at least one physical processor, and (3) physical memory including computer-executable instructions that, when executed by the physical processor, cause the physical processor to perform operations including (a) providing a plurality of media content groups, where each media content group includes a plurality of media content items, (b) providing a plurality of group indicators, where each group indicator corresponds with one of the media content groups, (c) providing a first navigational path linking the plurality of group indicators sequentially, (d) providing, for each media content group, a second navigational path linking the media content items of the corresponding media content group sequentially, (e) providing, for each media content group, a group entry point linking to one of the media content items of the corresponding media content group, and (f) presenting, by the user interface subsystem, a graphical user interface that facilitates access to the media content items of the media content groups, and to the group indicators, using the first navigational path, the second navigational paths, and the group entry points.

In some embodiments, the operations may further include (a) providing, for each media content group, an item overview for each media content item of the corresponding media content group that includes information describing at least one aspect of the corresponding media content group, (b) providing, for each media content group, a group overview entry point linking to one of the item overviews of the media content items of the corresponding media content group, where the group overview entry point links to an item overview of a same media content item of the corresponding media content group as the group entry point of the corresponding media content group, (c) providing, for each media content group, a third navigational path linking the item overviews of the corresponding media content group sequentially, as specified by an order of the media content items of the corresponding media content group indicated by the second navigational path of the corresponding media content group, (d) providing, for each media content item, a media content item link linking the corresponding media content item with its corresponding item overview, and (e) where presenting the graphical user interface further includes facilitating access to the item overviews of the corresponding media content group using the third navigational paths, the group overview entry points, and the media content item links.

In one example, a non-transitory computer-readable medium may include one or more computer-executable instructions that, when executed by at least one processor of a computing device, cause the computing device to perform operations including (1) providing a plurality of media content groups, where each media content group includes a plurality of media content items, (2) providing a plurality of group indicators, where each group indicator corresponds with one of the media content groups, (3) providing a first navigational path linking the plurality of group indicators sequentially, (4) providing, for each media content group, a second navigational path linking the media content items of the corresponding media content group sequentially, (5) providing, for each media content group, a group entry point linking to one of the media content items of the corresponding media content group, and (6) presenting a graphical user interface that facilitates access to the media content items of the media content groups, and to the group indicators, using the first navigational path, the second navigational paths, and the group entry points.

In some embodiments, the operations may further include (1) providing, for each media content group, an item overview for each media content item of the corresponding media content group that includes information describing at least one aspect of the corresponding media content group, (2) providing, for each media content group, a group overview entry point linking to one of the item overviews of the media content items of the corresponding media content group, where the group overview entry point links to an item overview of a same media content item of the corresponding media content group as the group entry point of the corresponding media content group, (3) providing, for each media content group, a third navigational path linking the item overviews of the corresponding media content group sequentially, as specified by an order of the media content items of the corresponding media content group indicated by the second navigational path of the corresponding media content group, (4) providing, for each media content item, a media content item link linking the corresponding media content item with its corresponding item overview, and (5) where presenting the graphical user interface further includes facilitating access to the item overviews of the corresponding media content group using the third navigational paths, the group overview entry points, and the media content item links.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may access media content items organized in media content groups, generate navigational paths and links among the media content items and other data structures, and provide a user interface that facilitates enhanced user navigation among the media content items at multiple interface levels. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    providing a plurality of media content groups, wherein each media content group comprises a plurality of media content items;
    providing a plurality of group indicators, wherein each group indicator corresponds with one of the plurality of media content groups;
    providing a first navigational path linking the plurality of group indicators sequentially and facilitated by a user gesture of a first type;
    providing, for each media content group, a second navigational path linking the plurality of media content items of the corresponding media content group sequentially and facilitated by a user gesture of a second type;
    providing, for each of the plurality of media content items, an additional navigational path linking the media content item to a group indicator of at least one of the plurality of group indicators and facilitated by a user gesture of a third type;
    presenting, to a user, a graphical user interface that facilitates access to a subset of the plurality of media content groups comprising at least a first media content group; and
    providing, for each media content group, a group entry point linking to one of the plurality of media content items of the corresponding media content group, wherein the group entry point for each media content group is employable, via a user gesture, from the group indicator for the corresponding media content group and from any of the plurality of media content items of a preceding media content group.

2. The computer-implemented method of claim 1, wherein the group entry point for each media content group is further employable: from any of the media content items of a following media content group.

3. The computer-implemented method of claim 1, further comprising:
    altering, in response to a new media content item being added to one of the plurality of media content groups, the second navigational path of the corresponding media content group to include the new media content item.

4. The computer-implemented method of claim 1, further comprising:
    presenting, via the graphical user interface in response to a user navigating from a media content item of the first media content group to a media content item of a second media content group using a group entry point of the second media content group, an indication that the second media content group is being entered.

5. The computer-implemented method of claim 4, further comprising:
providing, for the first media content group and the second media content group, a return navigational link from each of the media content items of the corresponding media content group to the group indicator; and
facilitating procession along the return navigational link by swiping along a first direction of the graphical user interface.

6. The computer-implemented method of claim 1, wherein:
the first media content group of the plurality of media content groups is available for access to a first group of users and a second media content group of the plurality of media content groups is available for access to a second group of users; and
a membership of the first group of users is different from a membership of the second group of users.

7. The computer-implemented method of claim 6, further comprising:
providing, for the first media content group and the second media content group, an item overview for each media content item of the corresponding media content group that includes information describing at least one aspect of the corresponding media content group;
providing, for the first media content group and the second media content group, a group overview entry point linking to one of the item overviews of the media content items of the corresponding media content group, wherein the group overview entry point links to an item overview of a same media content item of the corresponding media content group as the group entry point of the corresponding media content group;
providing, for the first media content group and the second media content group, a third navigational path linking the item overviews of the corresponding media content group sequentially, as specified by an order of the media content items of the corresponding media content group indicated by the second navigational path of the corresponding media content group;
providing, for each media content item, a media content item link linking each corresponding media content item with its corresponding item overview; and
wherein presenting the graphical user interface further comprises facilitating access to the item overviews using the third navigational paths, the group overview entry points, and the media content item links.

8. The computer-implemented method of claim 7, wherein the group overview entry point for the first media content group and the group overview entry point for the second media content group are employable from the group indicator for the corresponding media content group.

9. The computer-implemented method of claim 7, wherein the group overview entry point for the first media content group and the group overview entry point for the second media content group are employable from any of the item overviews of a preceding media content group.

10. The computer-implemented method of claim 7, wherein the group overview entry point for the first media content group and the group overview entry point for the second media content group are employable from any of the item overviews of a following media content group.

11. The computer-implemented method of claim 7, further comprising:
presenting, via the graphical user interface in response to a user navigating from an item overview of the first media content group to an item overview of the second media content group using the group overview entry point of the second media content group, an indication that the second media content group is being entered.

12. The computer-implemented method of claim 7, further comprising:
facilitating procession along the third navigational path by swiping along a second direction of the graphical user interface.

13. The computer-implemented method of claim 12, wherein the user gesture of the first type is a vertical swipe, the user gesture of the second type is horizontal swipe, and the user gesture of the third type is a tap.

14. The computer-implemented method of claim 12, further comprising:
providing, for the first media content group and the second media content group, a return navigational link from each of the item overviews of the corresponding media content group to the group indicator; and
facilitating procession along the return navigational link by swiping along a first direction of the graphical user interface.

15. The computer-implemented method of claim 1, wherein none of the plurality of media content items of the corresponding media content group are simultaneously visible or aligned along a first direction in the graphical user interface during procession along the second navigational path.

16. A system comprising:
a user interface subsystem;
at least one physical processor; and
physical memory comprising computer-executable instructions that, when executed by the at least one physical processor, cause the at least one physical processor to perform operations comprising:
providing a plurality of media content groups, wherein each media content group comprises a plurality of media content items;
providing a plurality of group indicators, wherein each group indicator corresponds with one of the plurality of media content groups;
providing a first navigational path linking the plurality of group indicators sequentially and facilitated by a user gesture of a first type;
providing, for each media content group, a second navigational path linking the plurality of media content items of the corresponding media content group sequentially and facilitated by a user gesture of a second type;
providing, for each of the plurality of media content items, an additional navigational path linking the media content item to a group indicator of at least one of the plurality of group indicators and facilitated by a user gesture of a third type;
presenting, by the user interface subsystem to a user, a graphical user interface that facilitates access to a subset of the plurality of media content groups comprising at least a first media content group; and
providing, for each media content group, a group entry point linking to one of the plurality of media content items of the corresponding media content group, wherein the group entry point for each media content group is employable, via a user gesture, from the group indicator for the corresponding media content group and from any of the plurality of media content items of a preceding media content group.

17. The system of claim 16, wherein the first media content group of the plurality of media content groups is available for access to a first group of users and a second media content group of the plurality of media content groups is available for access to a second group of users and a membership of the first group of users is different from a membership of the second group of users and the operations further comprise:
- providing, for the first media content group and the second media content group, an item overview for each media content item of the corresponding media content group that includes information describing at least one aspect of the corresponding media content group;
- providing, for the first media content group and the second media content group, a group overview entry point linking to one of the item overviews of the media content items of the corresponding media content group, wherein the group overview entry point links to an item overview of a same media content item of the corresponding media content group as the group entry point of the corresponding media content group;
- providing, for the first media content group and the second media content group, a third navigational path linking the item overviews of the corresponding media content group sequentially, as specified by an order of the media content items of the corresponding media content group indicated by the second navigational path of the corresponding media content group;
- providing, for each media content item, a media content item link linking the corresponding media content item with its corresponding item overview; and
- wherein presenting the graphical user interface further comprises facilitating access to the item overviews of the corresponding media content group using the third navigational paths, the group overview entry points, and the media content item links.

18. A non-transitory computer-readable medium comprising one or more computer-executable instructions that, when executed by at least one processor of a computing device, cause the computing device to perform operations comprising:
- providing a plurality of media content groups, wherein each media content group comprises a plurality of media content items;
- providing a plurality of group indicators, wherein each group indicator corresponds with one of the plurality of media content groups;
- providing a first navigational path linking the plurality of group indicators sequentially and facilitated by a user gesture of a first type;
- providing, for each media content group, a second navigational path linking the plurality of media content items of the corresponding media content group sequentially and facilitated by a user gesture of a second type;
- providing, for each of the plurality of media content items, an additional navigational path linking the media content item to a group indicator of at least one of the plurality of group indicators and facilitated by a user gesture of a third type;
- presenting, to a user, a graphical user interface that facilitates access to a subset of the plurality of media content groups comprising at least a first media content group; and
- providing, for each media content group, a group entry point linking to one of the plurality of media content items of the corresponding media content group, wherein the group entry point for each media content group is employable, via a user gesture, from the group indicator for the corresponding media content group and from any of the plurality of media content items of a preceding media content group.

19. The non-transitory computer-readable medium of claim 18, wherein the first media content group of the plurality of media content groups is available for access to a first group of users and a second media content group of the plurality of media content groups is available for access to a second group of users and a membership of the first group of users is different from a membership of the second group of users and the operations further comprise:
- providing, for the first media content group and the second media content group, an item overview for each media content item of the corresponding media content group that includes information describing at least one aspect of the corresponding media content group;
- providing, for the first media content group and the second media content group, a group overview entry point linking to one of the item overviews of the media content items of the corresponding media content group, wherein the group overview entry point links to an item overview of a same media content item of the corresponding media content group as the group entry point of the corresponding media content group;
- providing, for the first media content group and the second media content group, a third navigational path linking the item overviews of the corresponding media content group sequentially, as specified by an order of the media content items of the corresponding media content group indicated by the second navigational path of the corresponding media content group;
- providing, for each media content item, a media content item link linking the corresponding media content item with its corresponding item overview; and
- wherein presenting the graphical user interface further comprises facilitating access to the item overviews of the corresponding media content group using the third navigational paths, the group overview entry points, and the media content item links.

\* \* \* \* \*